US009298987B2

(12) United States Patent
Wang et al.

(10) Patent No.: US 9,298,987 B2

(45) Date of Patent: Mar. 29, 2016

(54) INFORMATION PROCESSING APPARATUS, INFORMATION PROCESSING METHOD, PROGRAM, AND INFORMATION PROCESSING SYSTEM

(71) Applicant: SONY CORPORATION, Minato-ku (JP)

(72) Inventors: QiHong Wang, Tokyo (JP); Kenichi Okada, Tokyo (JP); Ken Miyashita, Tokyo (JP); Akemi Tazaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 234 days.

(21) Appl. No.: 14/043,205

(22) Filed: Oct. 1, 2013

(65) Prior Publication Data

US 2014/0112533 A1 Apr. 24, 2014

(30) Foreign Application Priority Data

Oct. 22, 2012 (JP) ................................ 2012-232791

(51) Int. Cl.
*G06K 9/00* (2006.01)
*G08B 13/196* (2006.01)
*H04N 5/225* (2006.01)

(52) U.S. Cl.
CPC ...... *G06K 9/00624* (2013.01); *G08B 13/19608* (2013.01)

(58) Field of Classification Search
USPC ......... 382/100, 103, 106–107, 154, 162, 168, 382/173, 181, 189, 199, 203, 209, 218–219, 382/232, 254, 266, 274–276, 286, 291, 305, 382/312; 348/218.1; 398/128, 118
See application file for complete search history.

(56) References Cited

U.S. PATENT DOCUMENTS

| | | | | |
|---|---|---|---|---|
| 8,045,012 B2 * | 10/2011 | Miyanohara | ....... | A61B 1/00009 348/218.1 |
| 2009/0304234 A1 * | 12/2009 | Kondo | .................... | G06T 7/204 382/103 |
| 2013/0077874 A1 * | 3/2013 | Suzuki | ............... | H04N 1/00336 382/218 |
| 2014/0037296 A1 * | 2/2014 | Yamada | ................. | H04B 10/11 398/128 |
| 2014/0376922 A1 * | 12/2014 | Oshima | ................ | H04B 10/541 398/118 |

* cited by examiner

*Primary Examiner* — Seyed Azarian

(74) *Attorney, Agent, or Firm* — Hazuki International, LLC

(57) ABSTRACT

An information processing apparatus includes an input unit, an attention object detection unit, and a calculation unit. The input unit is configured to input a plurality of temporally continuous images taken by an image pickup apparatus. The attention object detection unit is configured to detect an attention object as an attention target from a first image which is an image taken at a first time point out of the plurality of images input. The calculation unit is configured to compare the first image with one or more second images which are one or more images taken at a time point previous to the first time point, to calculate, as a second time point, a time point when the attention object appears in the continuous plurality of images.

11 Claims, 16 Drawing Sheets

INFORMATION PROCESSING APPARATUS, INFORMATION PROCESSING METHOD, PROGRAM, AND INFORMATION PROCESSING SYSTEM

CROSS REFERENCE TO RELATED APPLICATIONS

This application claims the benefit of Japanese Priority Patent Application JP 2012-232791 filed Oct. 22, 2012, the entire contents of which are incorporated herein by reference.

BACKGROUND

The present disclosure relates to an information processing apparatus, an information processing method, a program, and an information processing system capable of being used for a surveillance camera system or the like.

In a surveillance camera system disclosed in Japanese Patent Application Laid-open No. 2009-225471 (hereinafter, referred to as Patent Document 1), for example, an image taken by a surveillance camera is displayed on a screen of a display, and a pointer that indicates a coordinate position of a pointing device is displayed while being overlaid on the image. By operating the pointing device, when the pointer is moved from a first point to a second point on the image taken by the surveillance camera, a remote control and surveillance apparatus transmits a predetermined control signal to the surveillance camera. On the basis of the control signal, the surveillance camera is moved in a movement direction of the pointer at speed proportional to a distance from the first point to the second point. As a result, the surveillance camera system excellent in operability is provided (see, paragraphs 0016, 0017, and the like of the specification of Patent Document 1).

SUMMARY

A technology for making it possible to achieve a useful surveillance camera system as disclosed in Patent Document 1 is being demanded.

In view of the above-mentioned circumstances, it is desirable to provide an information processing apparatus, an information processing method, a program, and an information processing system capable of achieving a useful surveillance camera system.

According to an embodiment of the present disclosure, there is provided an information processing apparatus including an input unit, an attention object detection unit, and a calculation unit.

The input unit is configured to input a plurality of temporally continuous images taken by an image pickup apparatus.

The attention object detection unit is configured to detect an attention object as an attention target from a first image which is an image taken at a first time point out of the plurality of images input.

The calculation unit is configured to compare the first image with one or more second images which are one or more images taken at a time point previous to the first time point, to calculate, as a second time point, a time point when the attention object appears in the continuous plurality of images.

In the information processing apparatus, the first image at the first time point when the attention object is detected is compared with the one or more second images at the time point previous to the first time point. Then, the second time point is calculated as the appearance time point of the attention object in the plurality of continuous images. As a result, it is possible to achieve a useful surveillance camera system.

When a detection of a predetermined object is maintained in one or more images from an image at a predetermined time point previous to the first time point to the first image, the attention object detection unit may detect the predetermined object as the attention object. In this case, the calculation unit may calculate the predetermined time point as the second time point by using, as a result of the comparison, the maintenance of the detection of the predetermined object with one or more images just before the first image from the image at the predetermined time point being as the one or more second images.

As described above, whether the detection of the predetermined object from the predetermined time point to the first time point is maintained may be determined. By using the maintenance of the detection as a result of the comparison between the first image at the first time point and the one or more second images to the first time point, the predetermined time point is calculated as the second time point.

The plurality of temporally continuous images may be obtained by taking images of a predetermined image pickup space. In this case, the information processing apparatus may further include a difference detection unit capable of detecting a difference between a reference image, which is obtained by taking an image of the predetermined image pickup space in a reference state, and each of the plurality of images. Further, the attention object detection unit may determine the maintenance of the detection of the predetermined object on the basis of the difference with the reference image detected by the difference detection unit.

As described above, the difference between the reference image and each of the plurality of images may be detected. On the basis of the detection result, the maintenance of the detection of the predetermined object may be determined.

The information processing apparatus may further include a motion image output unit capable of detecting a motion of the attention object detected and outputting a motion image that represents the motion.

By outputting the motion image, it is possible to clearly grasp the motion of the attention object.

The information processing apparatus may further include a person object detection unit capable of detecting an object of a person from the plurality of images. In this case, the motion image output unit may output a motion image of the person object nearest to the attention object in the image at the second time point.

As described above, the motion image of the person object nearest to the attention object may be output.

The information processing apparatus may further include a first storage unit and a person information output unit.

The first storage unit is configured to store information relating to the person object detected.

The person information output unit is configured to output, in accordance with an instruction to select the person object nearest to the attention object, information relating to the person object selected.

As a result, it is possible to easily obtain information relating to a person who probably has a relation to the attention object.

The information processing apparatus may further include a second storage unit and an associated image output unit.

The second storage unit is configured to store associating of a position in the motion image with the plurality of images.

The associated image output unit is configured to output, in accordance with an instruction to select a predetermined position in the motion image, an image associated with the selected predetermined position from the plurality of images.

By storing the associating mentioned above, to input the operation in the motion image makes it possible to display the image at the predetermined time point instinctively in an easy-to-understand manner.

The calculation unit may calculate the second time point by comparing a first region image that is an image of a region in the first image which includes at least the attention object with one or more second region images that are images of regions in the one or more second images which correspond to the first region image.

As described above, to calculate the second time point, the first and second region images, which are partial images of the first and second images, respectively, may be used.

According to another embodiment of the present disclosure, there is provided an information processing method including inputting a plurality of temporally continuous images taken by an image pickup apparatus.

An attention object as an attention target is detected from a first image which is an image taken at a first time point out of the plurality of images input.

By comparing the first image with one or more second images which are one or more images taken at a time point previous to the first time point, a time point when the attention object appears in the plurality of continuous images is calculated as a second time point.

According to another embodiment of the present disclosure, there is provided a program causing a computer to execute the steps of inputting a plurality of temporally continuous images taken by an image pickup apparatus, detecting an attention object as an attention target from a first image which is an image taken at a first time point out of the plurality of images input, and comparing the first image with one or more second images which are one or more images taken at a time point previous to the first time point, to calculate, as a second time point, a time point when the attention object appears in the continuous plurality of images.

According to another embodiment of the present disclosure, there is provided an information processing system including one or more image pickup apparatuses and an information processing apparatus.

The one or more image pickup apparatuses are capable of taking a plurality of temporally continuous images.

The information processing apparatus includes an input unit, an attention object detection unit, and a calculation unit.

The input unit is configured to input a plurality of temporally continuous images taken by an image pickup apparatus.

The attention object detection unit is configured to detect an attention object as an attention target from a first image which is an image taken at a first time point out of the plurality of images input.

The calculation unit is configured to compare the first image with one or more second images which are one or more images taken at a time point previous to the first time point, to calculate, as a second time point, a time point when the attention object appears in the continuous plurality of images.

As described above, according to the embodiments of the present disclosure, it is possible to achieve the useful surveillance camera system.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

(Surveillance Camera System)

Figure 1:
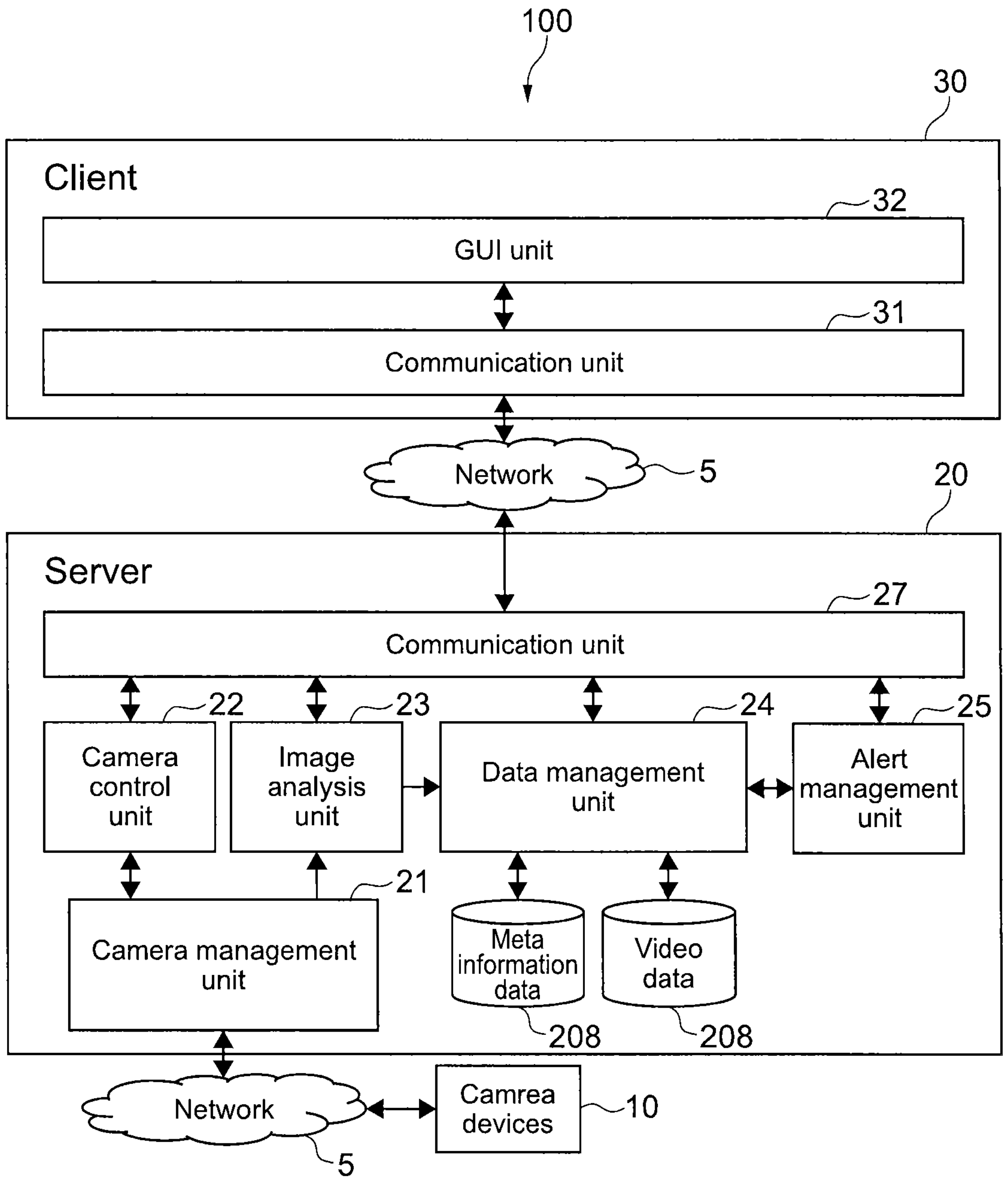
FIG. 1 is a block diagram showing an example of the structure of a surveillance camera system including an information processing apparatus according to an embodiment of the present disclosure.

FIG. 1 is a block diagram showing an example of the structure of a surveillance camera system including an information processing apparatus according to an embodiment of the present disclosure.

A surveillance camera system 100 includes one or more cameras 10, a server apparatus 20 serving as the information processing apparatus according to this embodiment, and a client apparatus 30. The one or more cameras 10 and the server apparatus 20 are connected with each other via a network 5. Further, the server apparatus 20 and a client apparatus 30 are also connected with each other via the network 5.

As the network 5, for example, a LAN (local area network), a WAN (wide area network), or the like is used. The kind of the network 5, a protocol used therefor, and the like are not limited. The two networks 5 shown in FIG. 1 may be different networks.

The cameras 10 are capable of taking a moving image of a digital video camera or the like. The cameras 10 generate moving image data and transmit the moving image data to the server apparatus 20 via the network 5.

Figure 2:
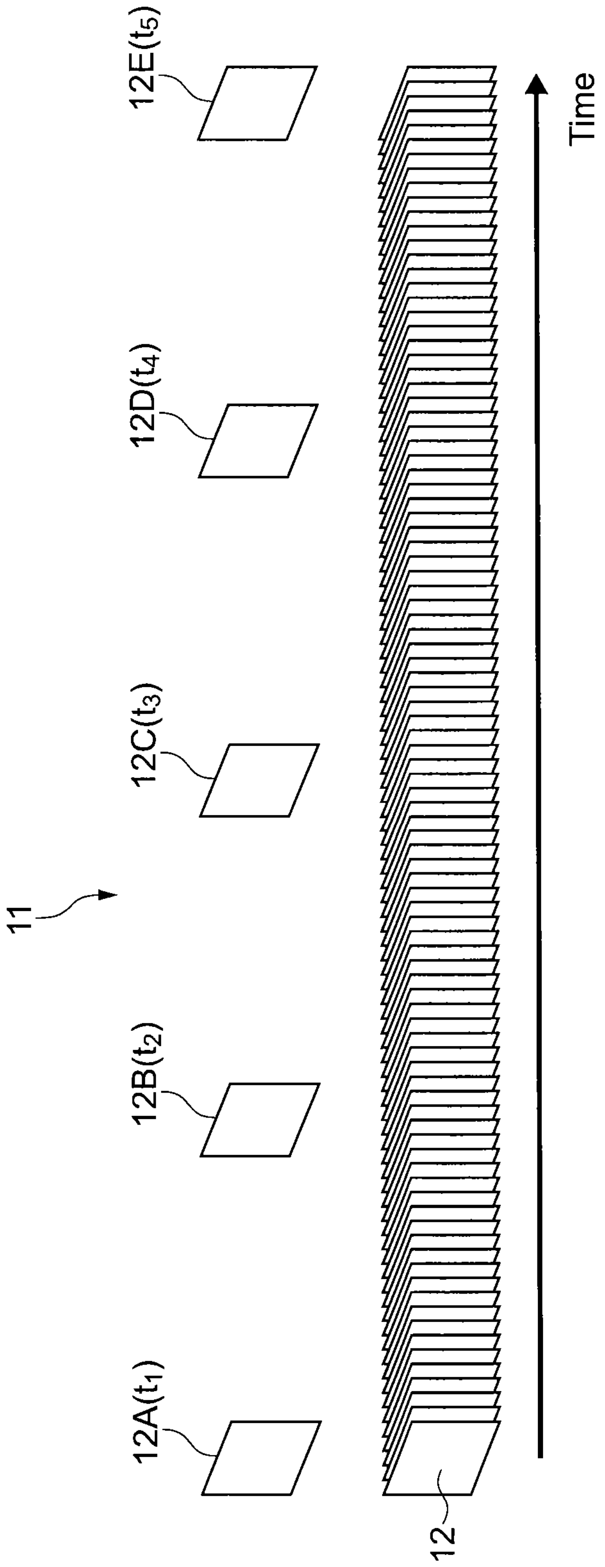
FIG. 2 is a schematic diagram showing an example of moving image data generated in the embodiment.

FIG. 2 is a schematic diagram showing an example of moving image data generated in this embodiment. A moving image data 11 is constituted of a plurality of temporally continuous frame images 12. The frame images 12 are generated at a frame rate of 30 fps (frame per second) or 60 fps, for example. It should be noted that the moving image data may be generated on a field basis by an interlace system. The cameras 10 each correspond to an image pickup apparatus according to the present disclosure.

As shown in FIG. 2, the plurality of frame images 12 are generated along a temporal axis. In FIG. 2, from the left side toward the right side, the frame images 12 are generated. Therefore, the frame images 12 disposed on the left side correspond to a first half of the moving image data 11, and the frame images 12 disposed on the right side correspond to a latter half of the moving image data 11.

The client apparatus 30 has a communication unit 31 and a GUI unit 32. The communication unit 31 is used for communication with the server apparatus 20 via the network 5. The GUI unit 32 displays the moving image data 11, a GUI (graphical user interface) for various operations, or other pieces of information, for example. The moving image data 11 or the like transmitted from the server apparatus 20 via the network 5 is received by the communication unit 31, for example. The moving image or the like is output to the GUI unit 32 and displayed on a display unit (not shown) by a predetermined GUI.

Via the GUI or the like displayed on the display unit, an operation from a user is input to the GUI unit 32. The GUI unit 32 generates instruction information on the basis of the input operation and outputs the information to the communication unit 31. The instruction information is transmitted to the server apparatus 20 via the network 5 by the communication unit 31. It should be noted that a block for generating and outputting the instruction information on the basis of the input operation may be provided separately from the GUI unit 32.

As the client apparatus 30, for example, a PC (personal computer) or a mobile terminal such as a tablet is used. However, the client apparatus 30 is not limited to those.

The server apparatus 20 includes a camera management unit 21, and a camera control unit 22 and an image analysis unit 23 which are connected to the camera management unit 21. The server apparatus 20 further includes a data management unit 24, an alert management unit 25, and a storage unit 208 for storing various pieces of data. The server apparatus 20 further includes a communication unit 27 used for communication with the client apparatus 30. To the communication unit 27, the camera control unit 22, the image analysis unit 23, the data management unit 24, and the alert management unit 25 are connected.

The communication unit 27 transmits the moving image 11 and various pieces of information output from the blocks connected thereto to the client apparatus 30 via the network 5. In addition, the communication unit 27 receives instruction information transmitted from the client apparatus 30 and output to the blocks in the server apparatus 20. For example, the instruction information may be output to the blocks via a control unit (not shown) or the like for controlling the operation of the server apparatus 20. In this embodiment, the communication unit 27 functions as an instruction input unit that inputs an instruction from the user.

The camera management unit 21 transmits a control signal from the camera control unit 22 to the cameras 10 via the network 5. As a result, various operations of the cameras 10 are controlled. For example, a pan and tilt operation, a zoom operation, a focus operation, and the like of the cameras are controlled.

In addition, the camera management unit 21 receives the moving image 11 transmitted from the cameras 10 via the network 5. Then, the camera management unit 21 outputs the moving image 11 to the image analysis unit 23. When necessary, a prior process such as a noise process may be carried out. In this embodiment, the camera management unit 21 functions as an input unit.

The image analysis unit 23 analyzes the moving image from each of the cameras 10 for each frame image 12. For example, the image analysis unit 23 analyzes the kind and number of objects in the frame images 12, a movement of an object therein, and the like. In this embodiment, the image analysis unit 23 detects an attention object as an attention target such as a suspicious object from the frame image 12 at a first time point out of the plurality of continuous frame images 12. Further, calculation is carried out with a time point when the attention object appears in the moving image data 11 being set as a second time point.

Further, the image analysis unit 23 can calculate a difference between two images. In this embodiment, the image analysis unit 23 detects the difference between the frame images 12. Further, the image analysis unit 23 detects differences between a predetermined reference image and the plurality of frame images 12. A technique used for calculating the difference between the two images is not limited. Typically, a difference in brightness value of the two images is calculated as the difference. In addition to this, an absolute sum of the difference in brightness value, a normalized correlation coefficient relating to the brightness value, a frequency component, or the like may be used to determine the difference. In addition, a technique used for a pattern matching or the like may be used as appropriate.

In this embodiment, by taking an image of a predetermined image pickup space, the moving image 11 constituted of the plurality of frame images 12 is generated. Here, an image in a reference state in the image pickup space is taken as the reference image. The reference state of the image pickup space means such a normal state that a suspicious object or the like does not exist in the image pickup space. On the basis of the difference between the reference image and the frame images 12, an object in the frame images 12 is detected. For example, if the frame images 12 are taken in the state in which a person exists in the image pickup space, the person is detected as the object. It should be noted that a method of detecting an object from the frame images 12 is not limited.

In addition, the image analysis unit 23 is capable of tracking the object detected. That is, the image analysis unit 23 detects the movement of the object and generates track data thereof. For example, positional information of the object to be tracked is calculated for each of the continuous frame images 12. The positional information is used as the track data of the object. The image analysis unit 23 tracks the attention object and a predetermined person object. A technique used for tracking the object is not limited, and a known technique may be used.

In addition, the image analysis unit 23 is capable of determining whether the object extracted from the frame images 12 is a person or not. Therefore, it is possible to detect an object of a person from the frame images 12.

The image analysis unit 23 according to this embodiment functions as a part of a motion image output unit, an attention object detection unit, a calculation unit, a difference detection unit, and a person object detection unit. The functions are not necessarily attained by one block, and blocks for attaining the functions may be individually set.

The data management unit 24 manages the moving image data 11, data relating to an analysis result by the image analysis unit 23, instruction data transmitted from the client apparatus 30, and the like. Further, the data management unit 24 manages meta information data stored in the storage unit 208, video data such as a past moving image, data relating to an alert indication from the alert management unit 25, and the like.

In this embodiment, the track data of a predetermined person object and the attention object is output from the image analysis unit 23 to the data management unit 24. Then, the data management unit 24 outputs a motion image that indicates a motion of the attention object or the like on the basis of the track data. It should be noted that a block for generating a motion image may be additionally provided to output the track data to the block from the data management unit.

Further, in this embodiment, the storage unit 208 stores information of the person object that appears in the moving image 11. For example, data of persons relating to a building or a company where the surveillance camera system 100 is used is stored therein in advance. For example, in the case where a predetermined person object is detected and selected, the data management unit 24 reads the information relating the person object from the storage unit 208 and output the information. It should be noted that, for persons such as outsiders whose data is not stored, data that indicates the fact may be output as the person object information.

In addition, the storage unit 208 stores associations between positions in the motion images and the plurality of frame images 12. On the basis of the associations, the data management unit 24 outputs the frame image 12 corresponding to a selected predetermined position from the plurality of frame images 12.

In this embodiment, the data management unit 24 functions as a part of a motion image output unit, a person information output unit, and a correspondence image output unit. Further, the storage unit 208 functions as first and second storage units.

The alert management unit 25 manages an alert indication with respect to an object in the frame images 12. For example, on the basis of an instruction from the user or an analysis result by the image analysis unit 23, a predetermined object is detected as an attention object (suspicious object or the like). A suspicious person or the like detected is subjected to alert display. At this time, kinds of the alert display, timings when the alert display is performed, and the like are managed. Further, a history or the like of the alert display is managed.

(Operation of Surveillance Camera System)

Figure 3:
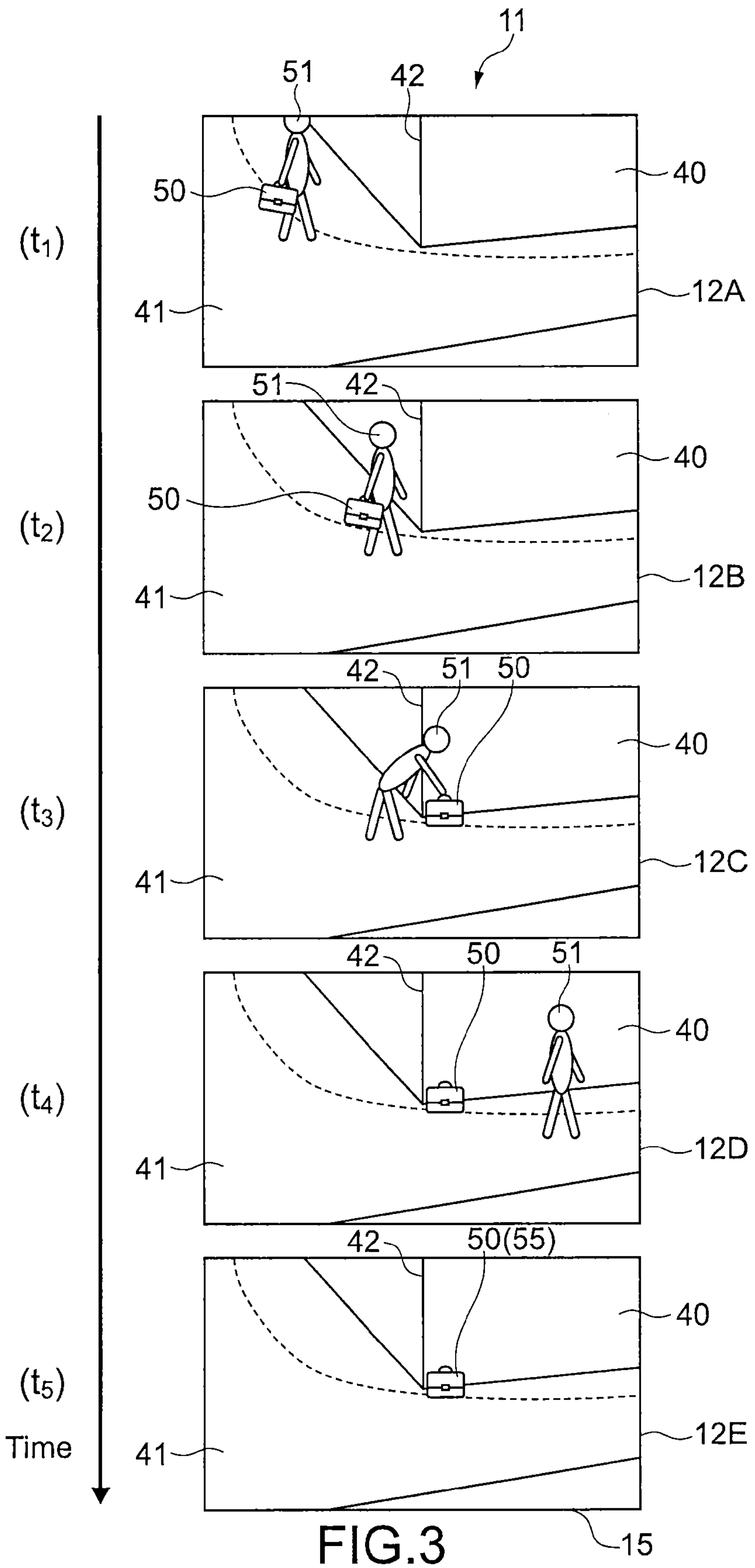
FIG. 3 is a schematic diagram showing an example of a moving image taken by a camera.

The outline of the operation of the surveillance camera system 100 according to this embodiment will be described. FIG. 3 is a schematic diagram showing an example of the moving image 11 taken by the camera 10.

As shown in FIG. 3, by the camera 10 that sets a predetermined space in a building 40 as the image pickup space, the moving image 11 is taken. Here, the image pickup space mainly including a corner 42 in a corridor 41 is taken. In the corridor 41 in the building 40, a person 51 who holds a bag 50 in a person's hand is walking (frame images 12A and 12B). The person 51 who is walking in the corridor 41 puts the bag 50 on the corridor at the corner 42 (frame image 12C). The person 51 proceeds in the corridor 41 and disappears from a screen 15 (frame images D and E). The moving image 11 described above is taken.

The five frame images 12A to 12E shown in FIG. 3 are set as the frame images located at predetermined intervals of the moving image data 11 shown in FIG. 2 (12A to 12E shown in FIG. 2). The frame images 12 are taken at predetermined times $t_1$ to $t_5$, respectively. Here, the frame image 12E taken at the time $t_5$ is set as a first image at a first time point. As an attention object 55, the bag 50 is detected from the frame image 12E.

Figure 4:
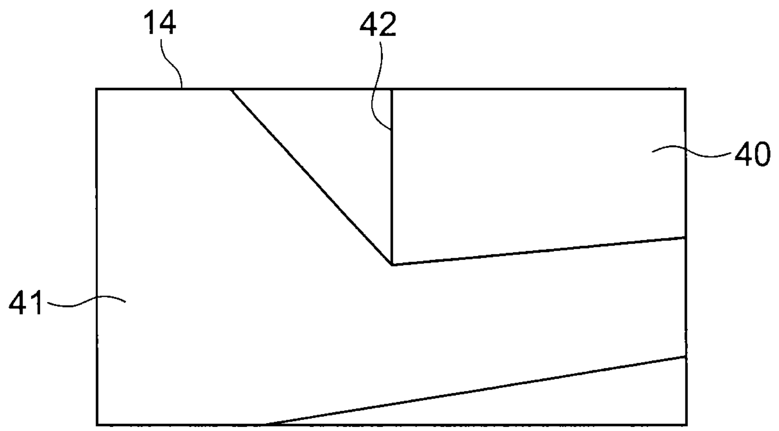
FIG. 4 is a schematic diagram showing an example of a reference image according to this embodiment.

As the method of detecting the attention object 55, any method may be used. For example, a reference image 14 shown in FIG. 4 is used, and on the basis of a difference between the reference image 14 and the frame image 12E, the attention object 55 may be detected. In this case, the bag 50 detected as the attention object 55 is handled as a suspicious object. Hereinafter, the attention object 55 may be sometimes referred to as the suspicious object 55.

The frame image 12E set as the first image is compared with one or more second images at time points previous to the time $t_5$ as the first time point. In this case, the frame images 12A to 12D shown in FIG. 3 are used as the second images. By comparing the frame image 12E with the frame images 12A to 12D, as an appearance time point of the attention object 55 in the plurality of continuous frame images 12, a second time point is calculated. In this case, a time point when the suspicious object 55 is put on the position of the corner 42 where the suspicious object 55 exists in the frame image 12E is calculated as the second time point.

As the method of calculating the appearance time point of the suspicious object 55, any method may be used. Typically, whether there is an image change in the area where the suspicious object 55 is placed is determined. Then, on the basis of the time when the frame image 12 is taken, the second time point is calculated. In the example shown in FIG. 3, the bag 50 exists at the corner 42 in the frame image 12C but does not exist at the corner 42 in the frame image 12B previous thereto. As a result, the time $t_3$ when the frame image 12C is taken is calculated as the second time point.

As described above, in this embodiment, by the server apparatus 20, the first image at the first time point when the attention object 55 is detected and the one or more second images at the time points previous to the first time point are compared with each other. The appearance time point of the attention object 55 in the plurality of continuous frame images 12 is calculated as the second time point. As a result, it is possible to easily confirm how the attention object 55 is put, a person who puts the attention object 55, or the like. Consequently, it is possible to achieve the useful surveillance camera system 100.

It should be noted that the frame images 12 set as the one or more second images are not limited. Any frame image 12 may be set as the second image, as long as the frame image 12 is an image taken at a previous time point to the first time point. As described above, the plurality of frame images 12 located at the predetermined intervals may be set as the second images. Alternatively, the plurality of continuous frame images 12 just before the first time point may be set as the second images.

Figure 5:
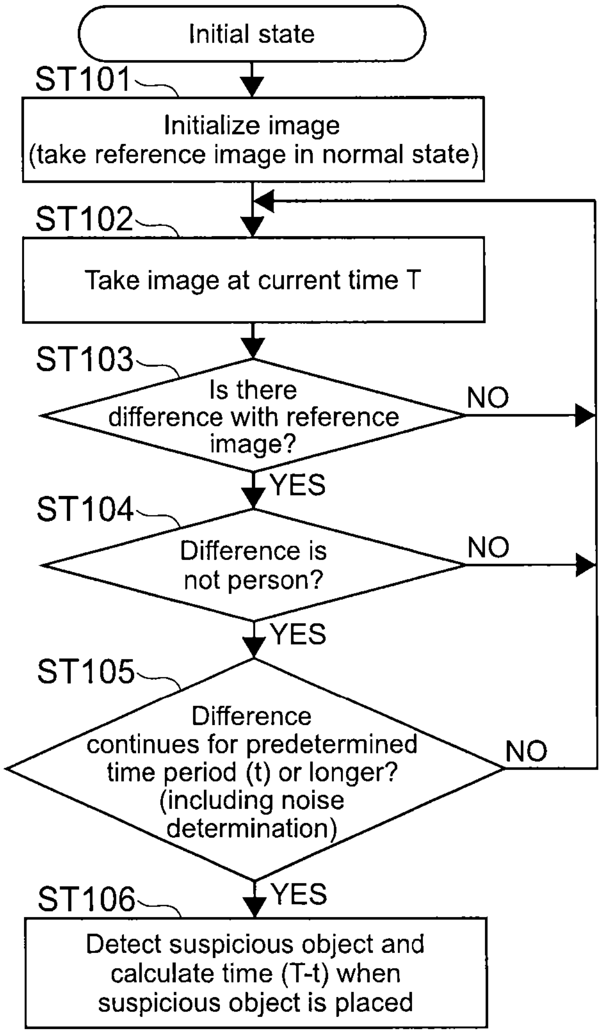
FIG. 5 is a flowchart showing a more specific process example for calculating a second time point.
Figure 6:
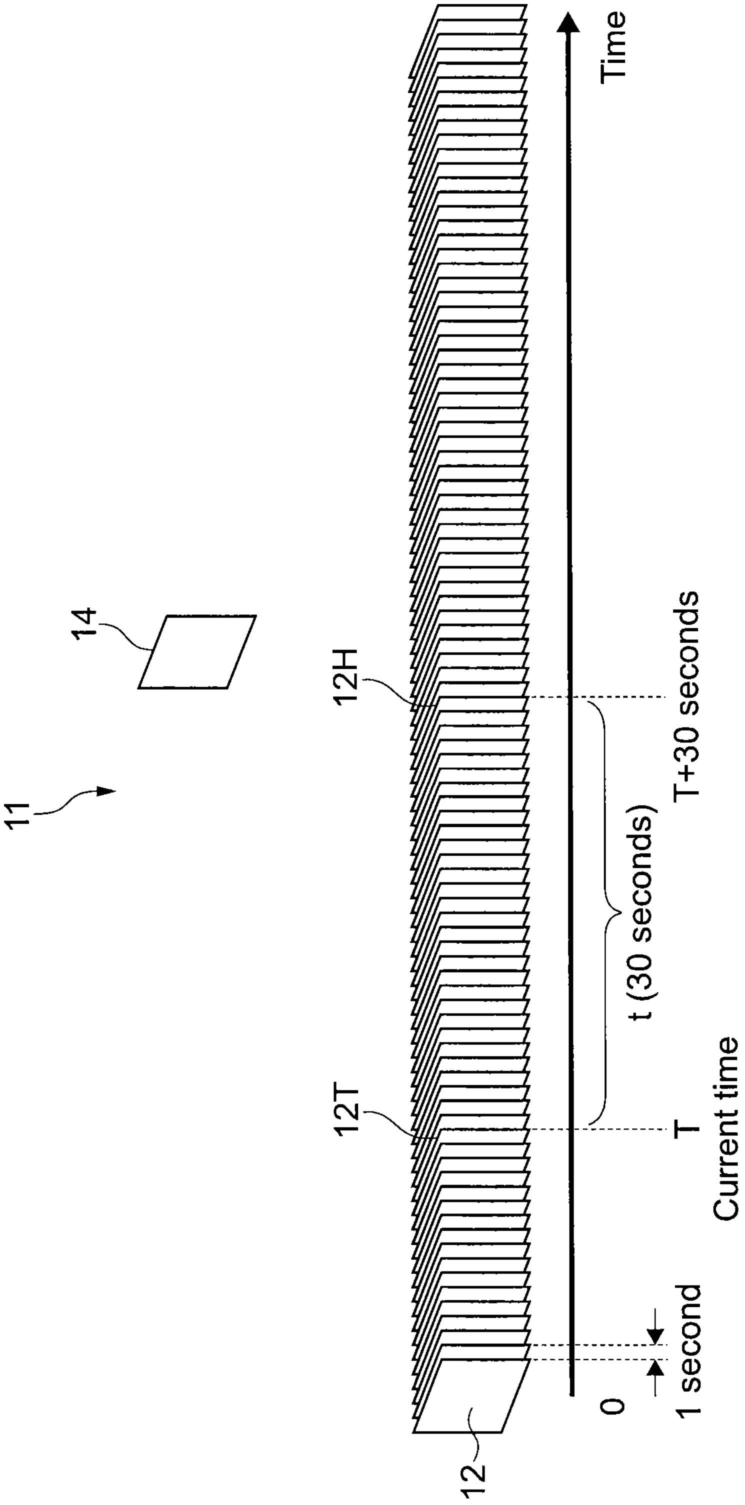
FIG. 6 is a schematic diagram showing the moving image 11 for explaining the process shown in FIG. 5.

FIG. 5 is a flowchart showing a more specific process example for calculating the second time point. FIG. 6 is a schematic diagram showing the moving image 11 for explaining the process. In the method of calculating the second time point to be described here, the moving image 11 is taken, and an object detection process is performed for the frame images 12. To detect the object, the reference image 14 is used. To perform the detection, first, the reference image 14 is taken as initialization of the image (Step ST101). When an image of the image pickup space in a reference state is started to be taken, an image taken first is used for the reference image 14. Alternatively, by taking in advance the image of the image pickup space in the reference state, the reference image may be prepared.

The image of the image pickup space is started to be taken, and then a frame image 12T at a current time T is taken (Step ST102). The current time T refers to time when the image taking is actually carried out. As the image taking progresses, a value of the current time T varies. For example, if an image taking start time is set at 0:00, the frame image 12 at 0:00 is taken as the frame image 12T at the current time T. In the case where one minute elapses from the current time T, the frame image 12 at 0:01 is taken as the frame image 12T at the current time T.

A difference between the frame image 12T at the current time T and the reference image 14 is calculated, and the object is detected (Step ST103). It should be noted that the object may be detected without using the reference image 14. In the case where there is no difference between the frame image 12T and the reference image 14 (No in Step ST103), the next frame image 12 is taken as the frame image 12T at the current time T (Step ST101).

It should be noted that all temporally continuous frame images 12 do not have to be compared with the reference image 14 in order. For example, the frame image 12 taken after a predetermined time elapses may be set as the next frame image 12T at the current time T. In this case, to simplify the explanation, the frame image 12 taken after one second elapses is taken as the next frame image 12T at the current time T. Therefore, a difference between the frame image 12 taken every one second and the reference image 14 is calculated.

In the case where there is the difference between the frame image 12T at the current time T and the reference image 14 (Yes in Step ST103), whether an object detected from the difference is a person object or not is determined (Step ST104). In the case where it is determined that the object detected is the person object (No in Step ST104), the next frame image 12 is taken as the frame image 12T at the current time T (Step ST101).

In the case where it is determined that the object detected is not the person object (Yes in Step ST104), whether or not the difference with the reference image 14 is continuous for a predetermined time period t or longer is determined (Step ST105). Accordingly, in Step St105, it is determined whether or not the detection of the predetermined object which is not the person is maintained for the predetermined time period t or longer.

To maintain the detection of the predetermined object means that the object is detected from the frame images 12 subsequent thereto. The predetermined time period t may be arbitrarily set. In this case, the predetermined time period t is set to 30 seconds. For example, if the predetermined object which is not the person is detected in the frame image 12T taken at the time T shown in FIG. 6, it is determined whether or not the detection of the predetermined object is maintained in thirty frame images 12 taken every one second after the frame image 12T.

In the case where it is determined that the detection of the object is not maintained for 30 seconds or more (No in Step ST105), the next frame image 12 after one second is taken, and the image is compared with the reference image 14 (Step ST101). In the case where the process proceeds from Step ST101 to Step ST105, whether or not the detection of the object is maintained is determined again.

In the case where it is determined that the detection of the predetermined object is maintained in the thirty frame images 12 subsequent to the frame image 12T (Yes in Step ST105), the predetermined object is detected as the suspicious object 55 (attention object 55) (Step ST106). Therefore, a 30th frame image 12H counted from the frame image 12T shown in FIG. 6 is set as the first image at the first time point. Because the first time point represents time when the frame image 12H is taken, the first time point is a point where T+30 seconds elapses from the time T shown in FIG. 6.

Further, as shown in Step ST106, as the second time point when the suspicious object 55 is placed, a time T-t is calculated. The time T shown in the flowchart indicates the time when the 30th frame image 12H is taken, so the time T-t is obtained by subtracting 30 seconds from the image taking time of the frame image 12H. Therefore, the time T-t corresponds to the time when the frame image 12T from which the object is detected for the first time is taken (in FIG. 6, time T+30−30=T). The image taking time when the frame image 12T from which the predetermined object is detected for the first time is calculated as the second time point.

A noise determination in Step ST106 will be described. To determine whether the detection of the predetermined object is maintained or not, an object detection process is carried out for the thirty frame images 12. At this time, an object may not be detected because the object is overlapped with a passerby, for example. This case is determined as a noise, and the determination whether the object detection is maintained or not is void.

As the method of determining the noise, for example, a detection result of the object in the frame images 12 previously and subsequently adjacent to the frame image 12 is used. For example, in the case where the predetermined object is detected in the previously and subsequently continuous frame images 12, the frame image 12 from which the object is not detected is determined as the noise. The method is not limited to the case where the previously and subsequently continuous frame images 12 are used. Another noise determination method may be used.

As described above, in the method of calculating the second time point shown in the flowchart of FIG. 5, when the detection of the predetermined object is maintained in the one or more frames from the frame image 12 at the predetermined time point previous to the first time point to the first image at the first time point, the predetermined object is detected as the attention object. As described above, in the case, for example, where the attention object 55 is detected at the same time when the moving image 11 is taken, the predetermined time point may be set in advance, and the time point when the maintenance of the detection of the object is attained may be set as the first time point.

Then, the predetermined time point is calculated as the second time point. At this time, the one or more frame images 12 just before the first image at the first time point from the frame image 12 at the predetermined time point are set as the second images. The maintenance of the detection of the predetermined object described above is used as the comparison result between the first image and the one or more second images. That is, the frame images 12 just before the first image and the frame image 12 as the first image are compared through the reference image 14.

In this embodiment, the comparison between the images includes the case where the images are directly compared with each other and the case where the images are indirectly compared with another image such as the reference image intervened therebetween.

Through the above processes, when the moving image 11 is taken, it is possible to perform both of the detection of the suspicious object 55 and the calculation of the second time point when the suspicious object 55 appears. As a result, it is possible to reduce a calculation quantity and shorten a process time.

Figure 7:
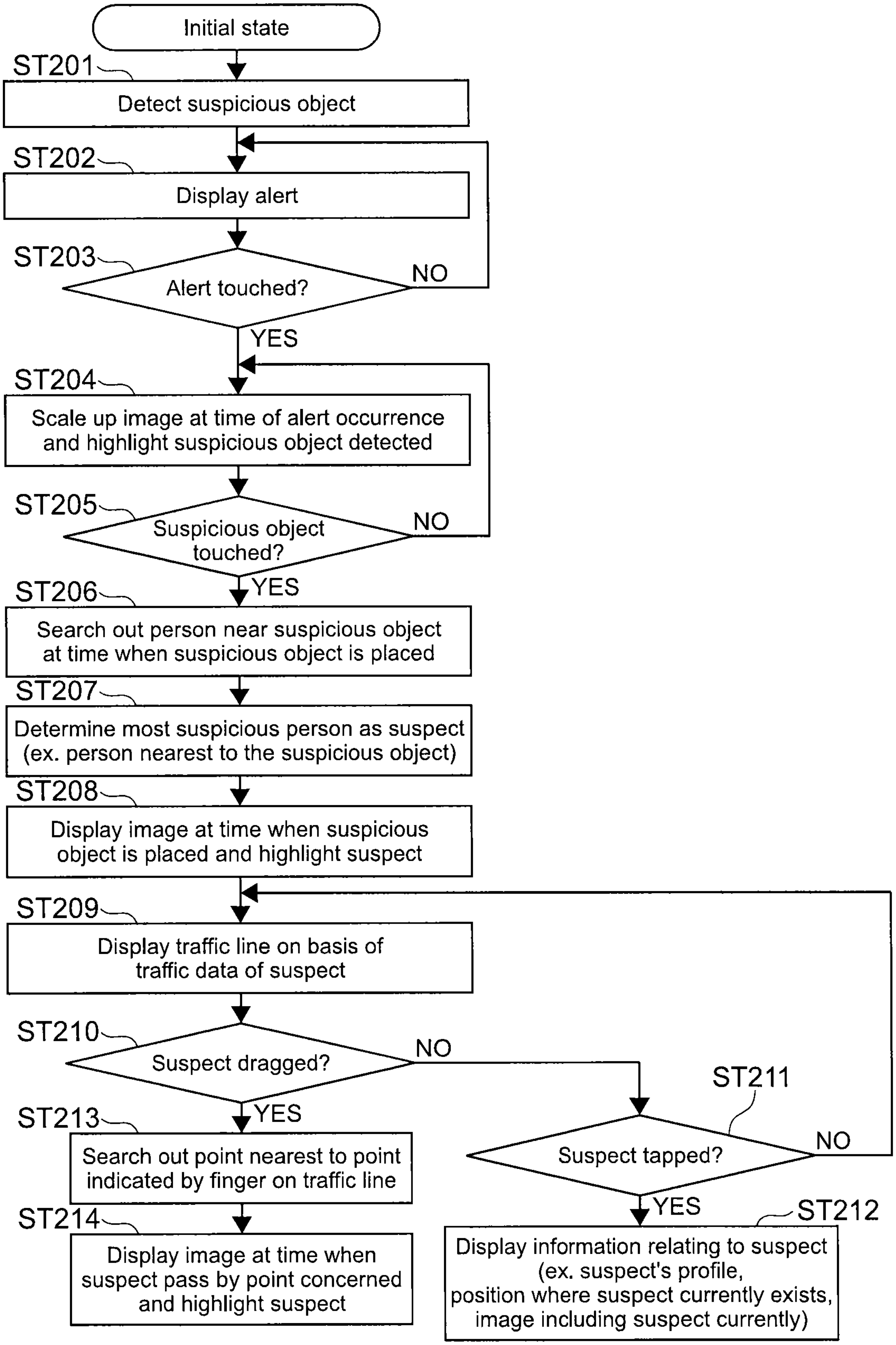
FIG. 7 is a flowchart showing a process example of an alert display or the like which is performed on the basis of a detection of a suspicious object and a calculation of an appearance time of the suspicious object.

FIG. 7 is a flowchart showing a process example of the alert display or the like which is performed on the basis of the detection of the suspicious object 55 and the calculation of the appearance time of the suspicious object 55. FIGS. 8 to 11 are diagrams for explaining the process.

In Step ST201, when the suspicious object 55 is detected, an alert is displayed (Step ST202). For example, in the client apparatus 30 shown in FIG. 8, in a plurality of divided regions 16 in the screen 15, the moving image 11 taken by each of the plurality of cameras 10 is displayed. In one divided region 16*a* out of the regions 16, the moving image 11 shown in FIG. 3 is displayed. When the bag 50 displayed in the frame image 12E shown in FIG. 3 is detected as the suspicious object 55, to the bag 50, an alert 56 is displayed. An image for the alert display, a method of displaying the alert 56, and the like are not limited.

It is determined whether the user inputs an operation for selecting the alert 56 or not. In this embodiment, the screen 15 is a touch panel and functions as an operation input unit. Therefore, in this case, it is determined whether the user touches the alert 56 or not (Step ST203).

Figure 8:
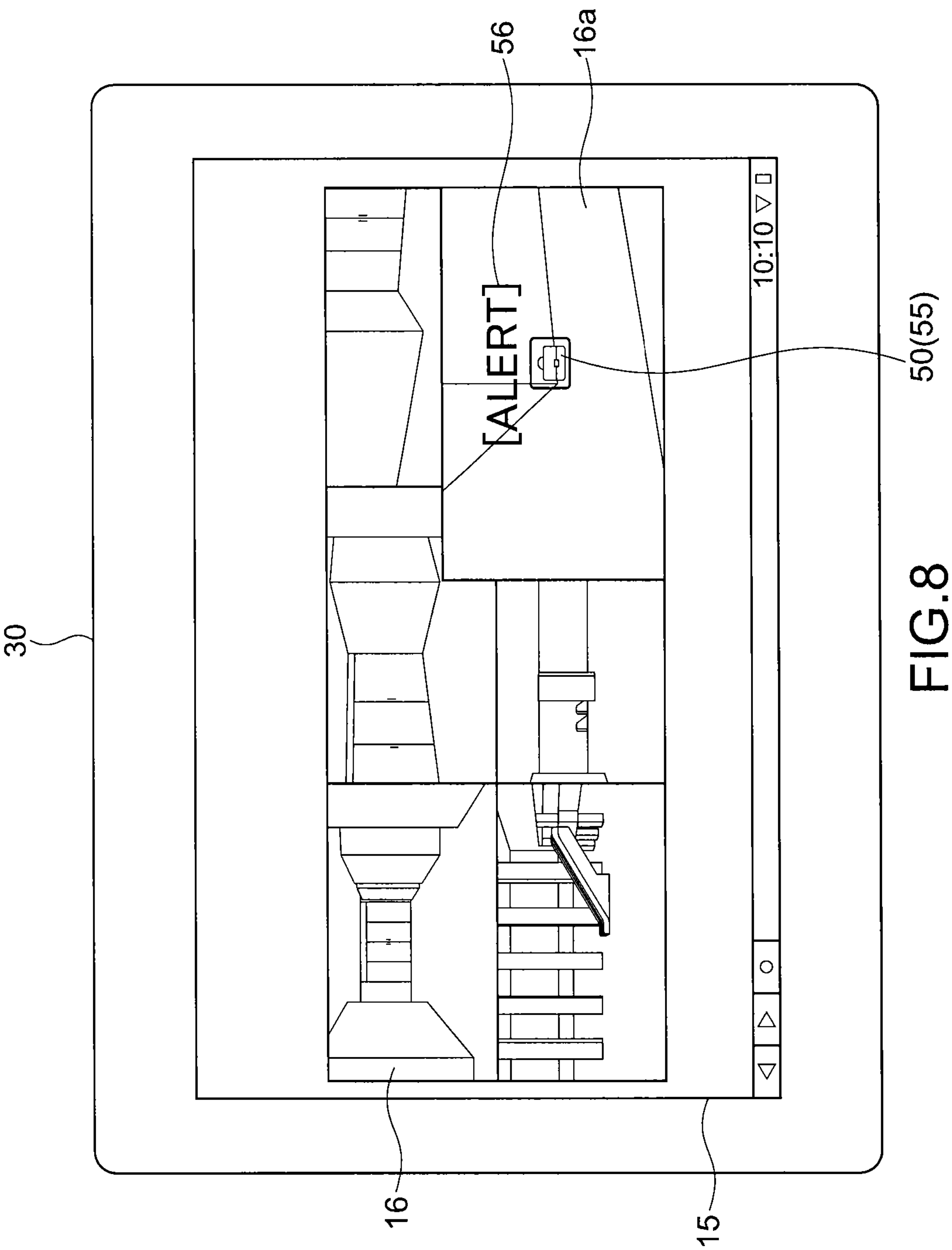
FIG. 8 is a schematic diagram showing a screen of a client apparatus at a time when the process shown in FIG. 7 is executed.
Figure 9:
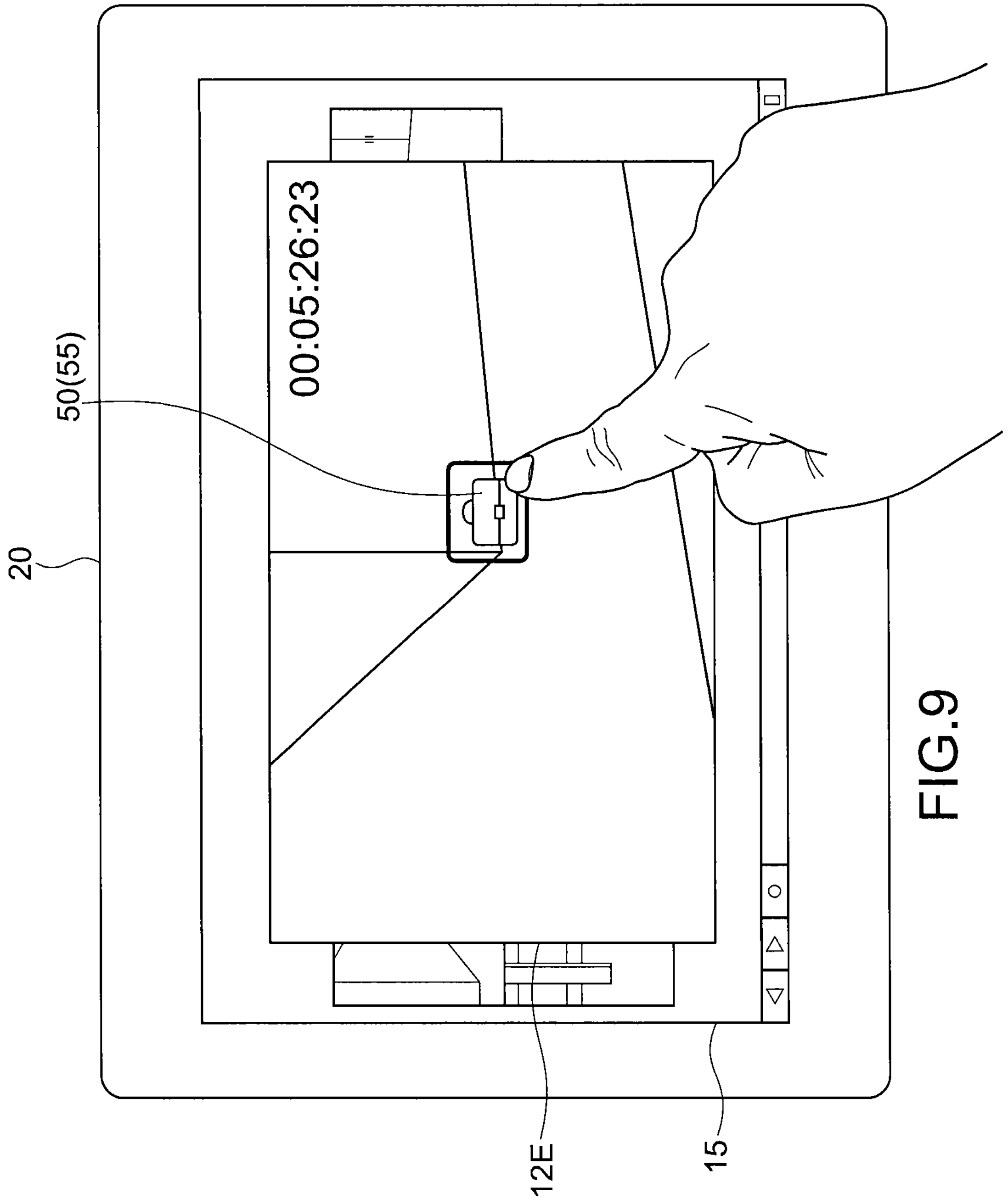
FIG. 9 is a schematic diagram showing the screen of the client apparatus at a time when the process shown in FIG. 7 is executed.

In the case where it is determined that the touch operation to the alert 56 is not performed (No in Step ST203), the display shown in FIG. 8 is maintained. In the case where it is determined that the touch operation to the alert 56 is performed (Yes in Step ST203), as shown in FIG. 9, the frame image 12E is scaled up as an image at a time when an alert occurs, and the bag 50 as the suspicious object 55 is highlighted (Step ST204). An image or the like for highlighting the bag 50 as the suspicious object 55 is not limited.

It is determined whether the touch operation to the suspicious object 55 is input or not (Step ST205). In the case where it is determined that the touch operation to the suspicious object 55 is not performed (No in Step ST205), the scaled-up display shown in FIG. 9 is maintained. In the case where it is determined that the touch operation to the suspicious object 55 is performed (Yes in Step ST205), a person object in the vicinity of the suspicious object 55 is detected at the time (second time point) when the suspicious object 55 is placed (Step ST206).

Typically, from the frame image 12 at the time when the suspicious object 55 is placed, the person object is detected. From the preceding and subsequent frame images 12 close to the time when the suspicious object 55 is placed, the person object may be detected. A most suspicious person among the person objects detected is set as a suspect 58 (Step ST207). Typically, the person object closest to the attention object 55 as the suspicious object 55 is set as the object of the suspect 58. Alternatively, in the plurality of frame images 12 which are close to the time when the suspicious object 55 is placed, a person who appears therein for the longest time period may be set as the suspect 58.

Figure 10:
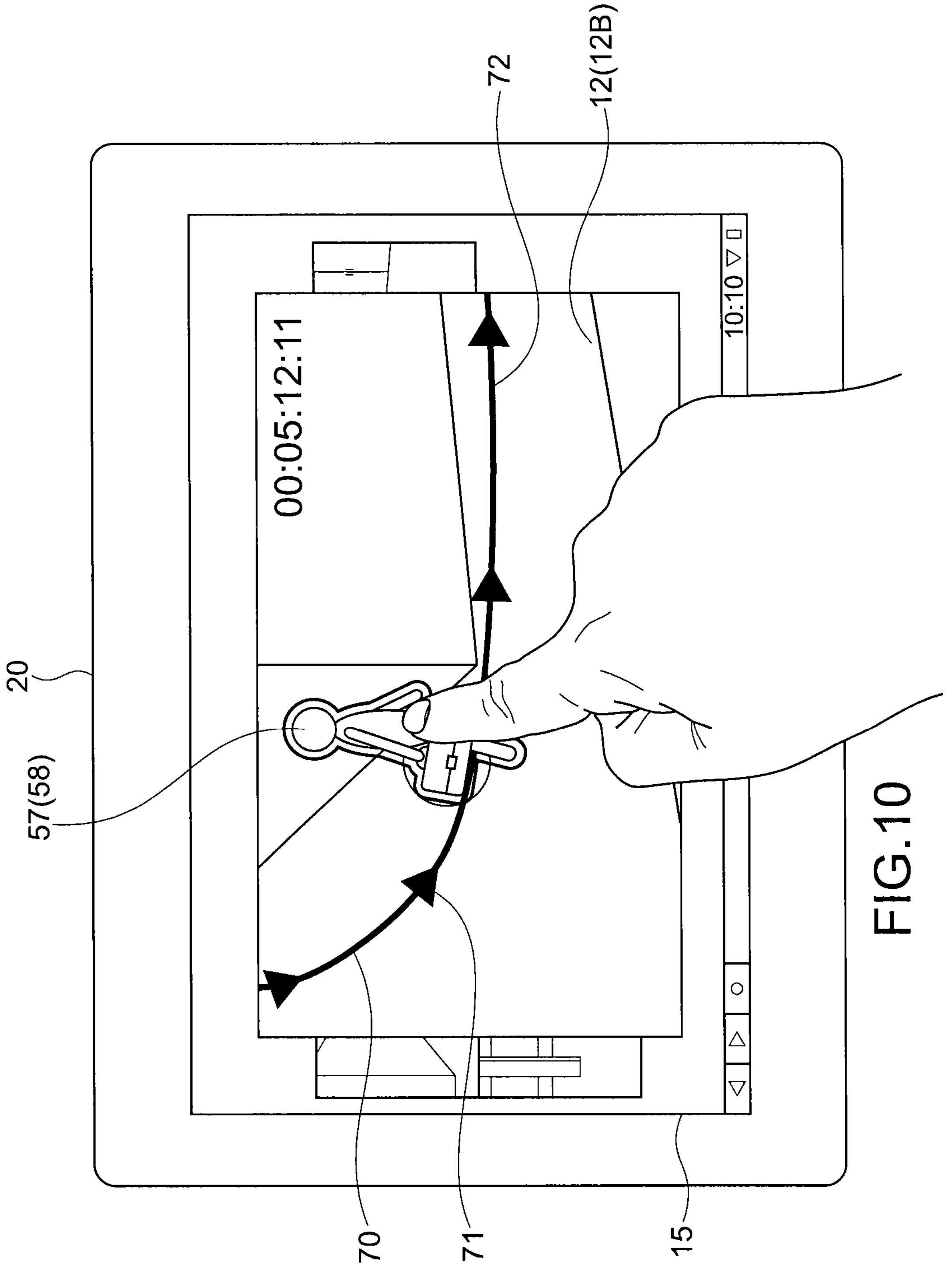
FIG. 10 is a schematic diagram showing the screen of the client apparatus at a time when the process shown in FIG. 7 is executed.

As shown in FIG. 10, the frame image 12 at the time when the suspicious object 55 is placed is displayed, and the person object 57 set as the suspect 58 is highlighted (Step ST208). In this case, as the one or more second images, the frame image 12C shown in FIG. 3 is not selected. As the frame image at the time when the suspicious object 55 is placed, the frame image 12B shown in FIG. 3 is displayed.

In the frame image 12B displayed, a motion image 70 that indicates the motion of the person object 57 set as the suspect 58 is output (Step ST209). The motion image 70 is generated and displayed on the basis of track data including positional information and the like of the person object 57 in each of the frame images 12. The image used as the motion image 70 is not limited. In this embodiment, a traffic line 72 to which arrows 71 are attached is displayed as the motion image 70.

That is, in this embodiment, in the case where the suspicious object 55 is detected as the attention object 55, the motion image 70 of the person object 57 nearest to the suspicious object 55 in the frame image 12B as the image at the second time point is output. As a result, it is possible to detect a person or the like who has carried the suspicious object 55, for example.

Whether a drug operation with respect to the suspect 58 is input or not is determined (Step ST210). In the case where it is determined that the drug operation is not input (No in Step ST210), whether a tap operation with respect to the suspect 58 is input or not is determined (Step ST211). In the case where it is determined that the tap operation with respect to the suspect 58 is not input (No in Step ST211), displaying the frame image 12B shown in FIG. 10 is maintained.

In the case where it is determined that the tap operation with respect to the suspect 58 is input (Yes in Step ST211), it is determined that an instruction to select the person object 57 set as the suspect 58 is input. Then, the information relating to the object 57 of the suspect 58 selected is output (Step ST212). The information of the person object 57 is read from the storage unit 208 and output. As a result, it is possible to easily obtain the information of the person who probably has a relation to the suspicious object 55.

Figure 11:
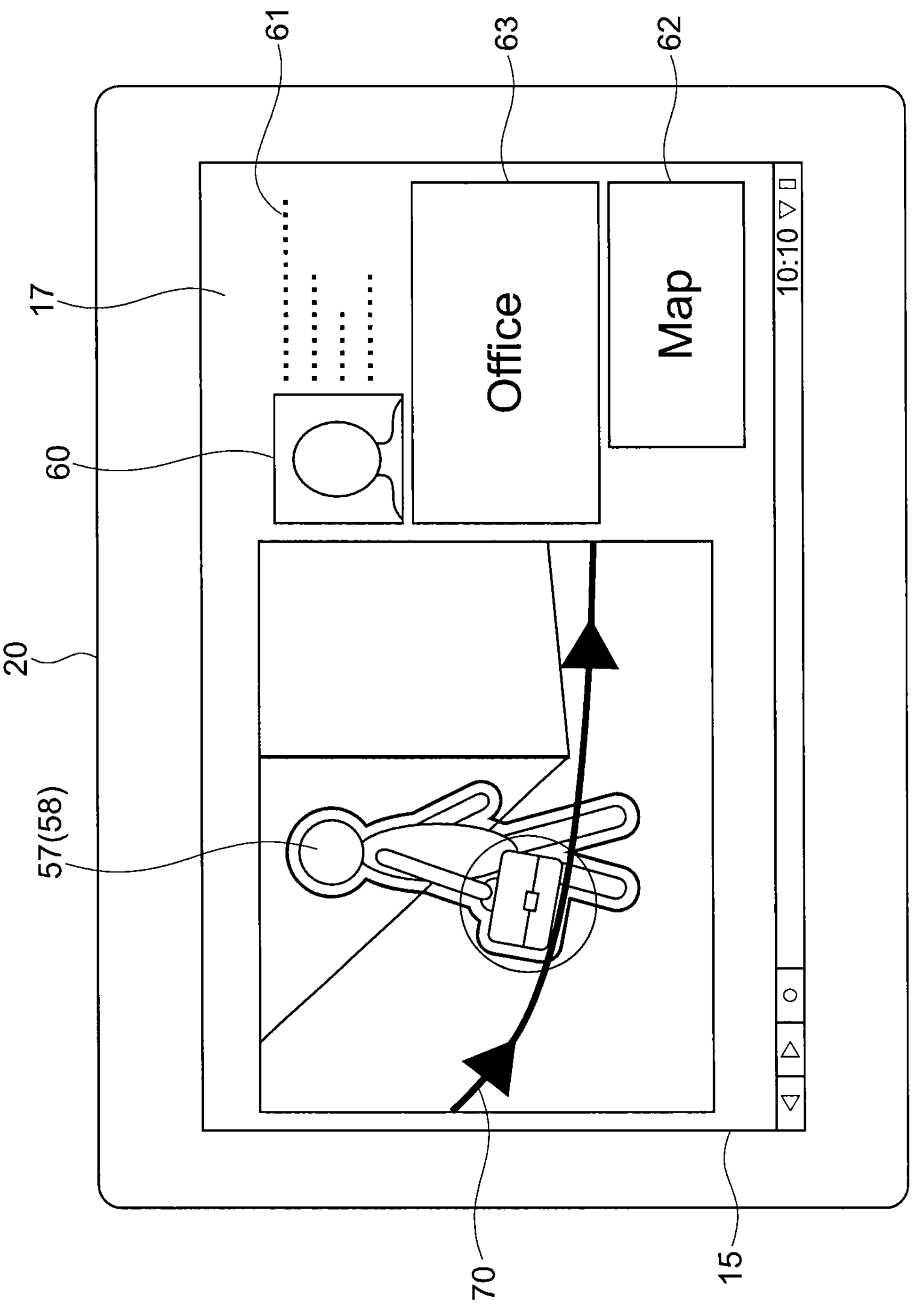
FIG. 11 is a schematic diagram showing the screen of the client apparatus at a time when the process shown in FIG. 7 is executed.

FIG. 11 is a diagram showing an example of an image in which the information of the person object 57 is output. As shown in FIG. 11, for example, a predetermined region 17 on the screen 15, the information relating to the person object 57 is output. Examples of the information relating to the person object 57 (suspect 58) include a face picture 60 of the suspect 58, a text data 61 that indicates a profile thereof, a map information 62 that indicates a current position of the suspect 58, an image 63 in which the suspect 58 currently exists, or the like. In the example shown in FIG. 11, the fact that the suspect 58 is in an office is detected. An image of the camera set in the office is displayed as the image 63. As the information of the person object 57, another piece of information may be displayed as necessary.

In the case where it is determined that the drug operation with respect to the suspect 58 is input in the frame image 12B shown in FIG. 10 (Yes in Step ST210), a position nearest to the position indicated by a finger as a drug destination is calculated on the traffic line 72 as the motion image 70 (Step ST213). The frame image 12 corresponding to the calculated position on the traffic line 72 is output and displayed.

To associate the positions on the motion image 70 with the plurality of frame images 12, it is conceived that a distance between the position on the traffic line 72 and the position of the suspect 58 and a temporal distance are associated with each other. In the case of a position distanced from the suspect 58, the frame image 12 temporally distanced in the past or the future is displayed. In this case, the traffic line 72 is simply used as a seeking bar.

For example, in the frame image 12B shown in FIG. 10, when the drag operation is input leftward, which is the opposite direction to the arrows, the frame image 12A or the like shown in FIG. 3, which is taken in the past as compared to the frame image 12B, is displayed. In contrast, when the drag operation is input rightward, which is the direction indicated by the arrows, the frame image 12C, 12D, or 12E shown in FIG. 3, which is taken in the future as compared to the frame image 12B, is displayed. By performing the rightward drug operation slightly, it is possible to confirm the frame image 12C at the moment when the person object 57 shown in FIG. 3 places the bag 50.

Alternatively, the position on the traffic line 72 and the frame image 12 at a time when the suspect 58 passes by the position may be associated with each other. In this case, it is possible to display the frame image 12 at the time when the suspect 58 exists at a predetermined position on the traffic line 72 by performing the drag operation to the predetermined position. In Step ST214 of FIG. 7, on the basis of the association described above, the frame image 12 is displayed, and the suspect 58 is highlighted.

By storing the association as described above, it is possible to display the frame image 12 at a predetermined time point instinctively in an easy-to-understand manner by inputting the operation on the motion image 70, for example. As a result, it is possible to easily perform seeking for the frame images 12.

Figure 12:
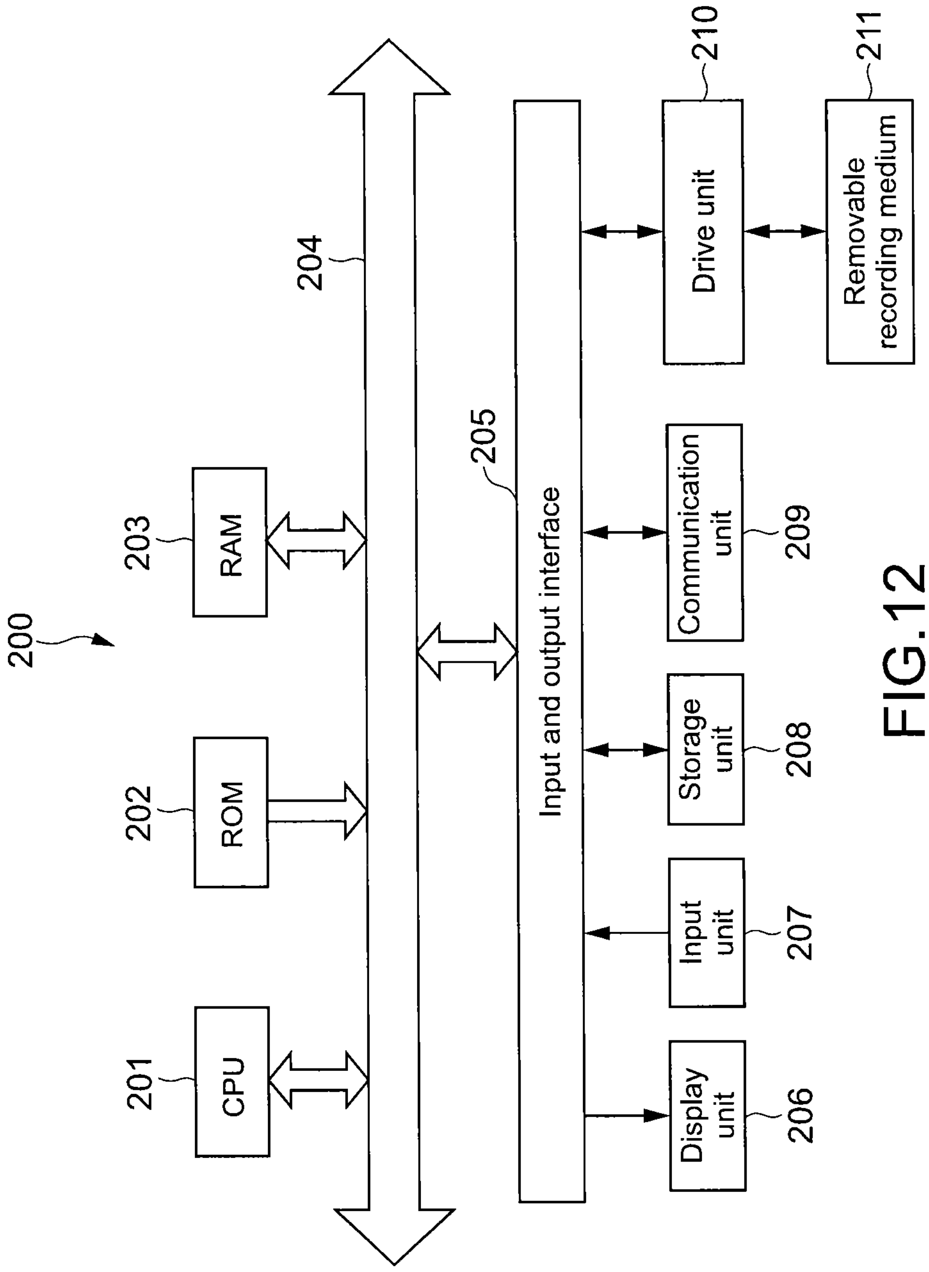
FIG. 12 is a schematic block diagram showing an example of the structure of a computer used as the client apparatus and a server apparatus.

In the above embodiments, as the client apparatus 30 and the server apparatus 20, various computers such as a PC (personal computer) are used. FIG. 12 is a schematic block diagram showing an example of the structure of the computer.

A computer 200 is provided with a CPU (central processing unit) 201, a ROM (read only memory) 202, a RAM (random access memory) 203, an input and output interface 205, and a bus 204 that connects those units.

To the input and output interface 205, a display unit 206, an input unit 207, a storage unit 208, a communication unit 209, a drive unit 210, and the like are connected.

The display unit 206 is a display device that uses liquid crystal, EL (electro-luminescence), a CRT (cathode ray tube), or the like.

The input unit 207 is, for example, a controller, a pointing device, a keyboard, a touch panel, or another operation apparatus. In the case where the input unit 207 includes the touch panel, the touch panel can be integral with the display unit 206.

The storage unit 208 is a non-volatile storage device such as an HDD (hard disk drive), a flash memory, and another solid-state memory.

The drive unit 210 is a device capable of driving a removable storage medium 211 such as a floppy (registered trademark) disk, a magnetic recording tape, and a flash memory. In contrast, the storage unit 208 is often used as a device which is mounted on the computer 200 in advance and mainly drives a non-removable recording medium.

The communication unit 209 is a modem, a router, or another communication apparatus for performing communication with another device, which is connectable to a LAN, a WAN (wide area network), or the like. The communication unit 209 may perform wired or wireless communication. The communication unit 209 is often used separately from the computer 200.

The information processing by the computer 200 having the hardware structure described above is achieved with software stored in the storage unit 208, the ROM 202, or the like and the hardware resource of the computer 200 cooperated with each other. Specifically, the information processing is achieved by loading programs that constitute the software stored in the storage unit 208, the ROM 202, or the like to the RAM 203 and executing the programs by the CPU 201. For example, the CPU 201 executes predetermined programs, thereby achieving the blocks shown in FIG. 1.

The programs are installed in the computer 200 via a recording medium, for example. The programs may be installed to the computer 200 via a global network or the like.

Further, the programs executed by the computer 200 may be processed in a chronological order in accordance with the order described above or may be processed in parallel or at necessary timings when the programs are called, for example.

MODIFIED EXAMPLE

The present disclosure is not limited to the above embodiment and is variously modified.

In the above description, by comparing the first image at the first time point with the one or more second images at the time point previous thereto, the second time point is calculated. Instead, by comparing a first region image, which is an image of a region including at least the attention object of the first image, with one or more second region images, which are images of a region of the one or more second images corresponding to the first region image, the second time point may be calculated.

For example, in the frame image 12E or the like shown in FIG. 3, when a region including the bag 50 is specified, the image of the region including at least the bag 50 is set as the first region image. In other words, a partial image of the frame image is set as the first region image. The size of the first region image is set in accordance with an instruction by a user, for example. Alternatively, a predetermined size including the attention subject may be calculated and determined as appropriate.

Then, images of regions each having the same size at the same position as the first region image are set as the one or more second region images. The first and second region images may be compared to calculate the second time point. That is, on the basis of the partial images of the first and second images, the second time point may be calculated.

For example, the first region image including the bag 50 is compared with the past second region image, thereby calculating the second time point as a time point when the bag 50 appears in the region. As a result, it is possible to calculate the time point when the object to which the user wants to pay attention appears. It is possible to calculate an appearance time point of an object which is not detected as the attention object 55, for example.

In the above description, in the case where the suspicious object is detected as the attention object, the motion image relating to the person object nearest to the suspicious object is output. The motion image relating to the attention object may be output on the basis of the track data of the attention object set as the suspicious object. As a result, it is possible to clearly grasp the motion of the suspicious object before and after the time point when the suspicious object appears.

On the other hand, by obtaining the track data of only the person object, it is possible to reduce a calculation quantity and shorten a process time.

In addition, as a surveillance camera system according to the present disclosure, the following process can be performed. In the following process, on monitoring images (including a real time image, a playback image, and the like) from a camera, a predetermined UI (user interface) is overlaid. As a result, it is possible to perform an instinctive operation.

Figure 13:
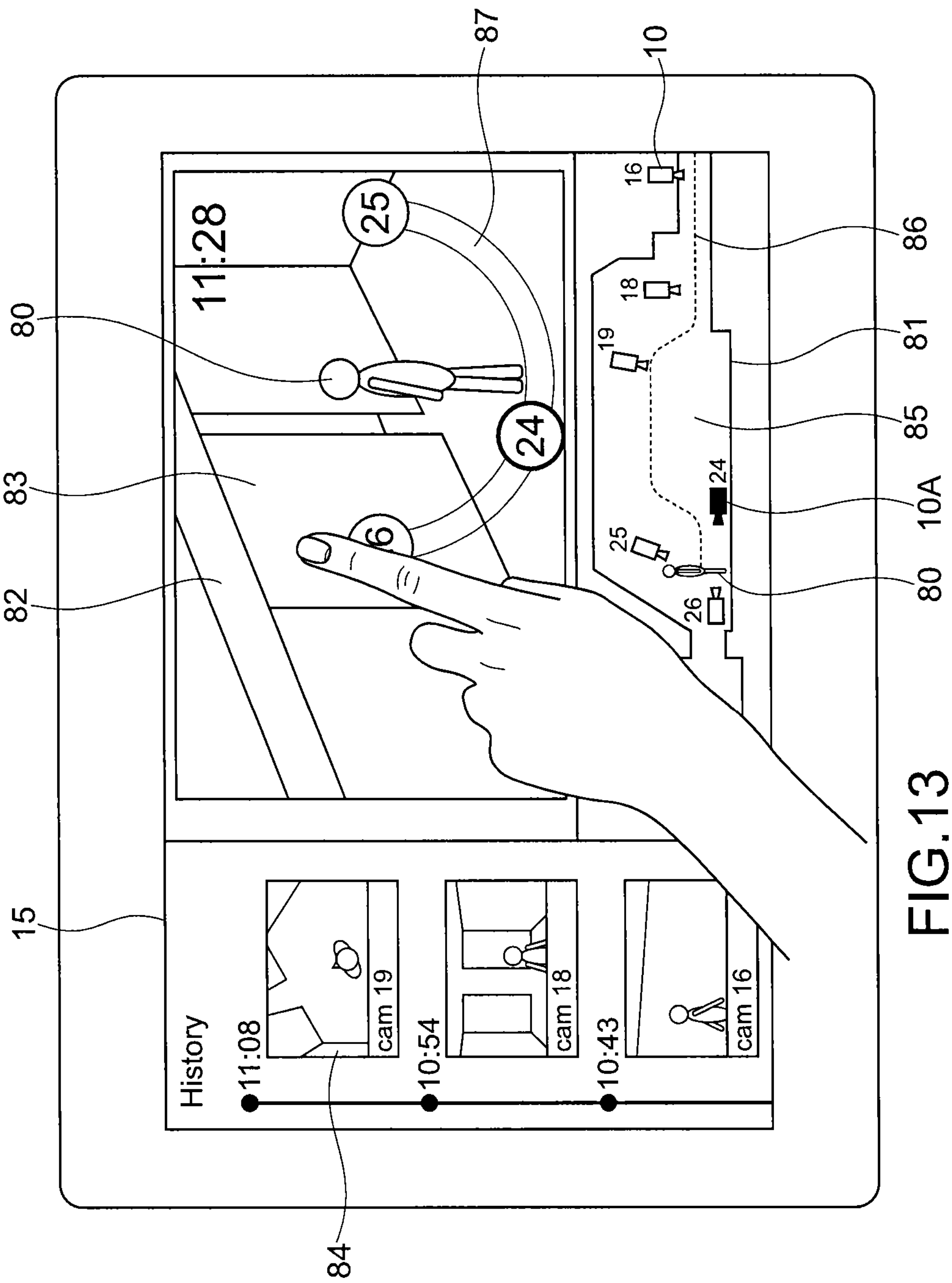
FIG. 13 is a diagram for showing a process capable of being executed by a surveillance camera system according to the present disclosure.

For example, on the screen 15 shown in FIG. 13, an image taken by the plurality of numbered cameras 10 and a UI 81 that indicates a positional relationship between the plurality of cameras and a person object 80 are displayed. For example, a door 83 in an image 82 is secured, and an access by the person 80 is denied. In this case, the image 82 that shows the person 80 in front of the door 83 is displayed in an enlarged manner. History images 84 of the person 80 who goes to the front of the door 83 are displayed in a left end region of the screen 15. The history images 84 are taken by the cameras 10 installed in a corridor 85 to the door 83. On the basis of the image taking time, it is possible to grasp the behavior of the person 80.

In the UI 81 that shows the positional relationship between the plurality of cameras 10 and the person 80, a motion image 86 that indicates a motion of the person 80 is displayed. Further, a camera 10A, which is denoted by number 24 in the UI 81, is colored. This means that the camera 10A is a camera that takes the image 82. By operating a semicircular UI 87 in which the numbers of the cameras 10 are indicated in the image 82, it is possible to instinctively switch the cameras 10.

For example, while interactively switching the plurality of cameras 10 that take the person 80, it is possible to confirm an access authentication of the person 80 and retrieve the history by using the past images.

Figure 14:
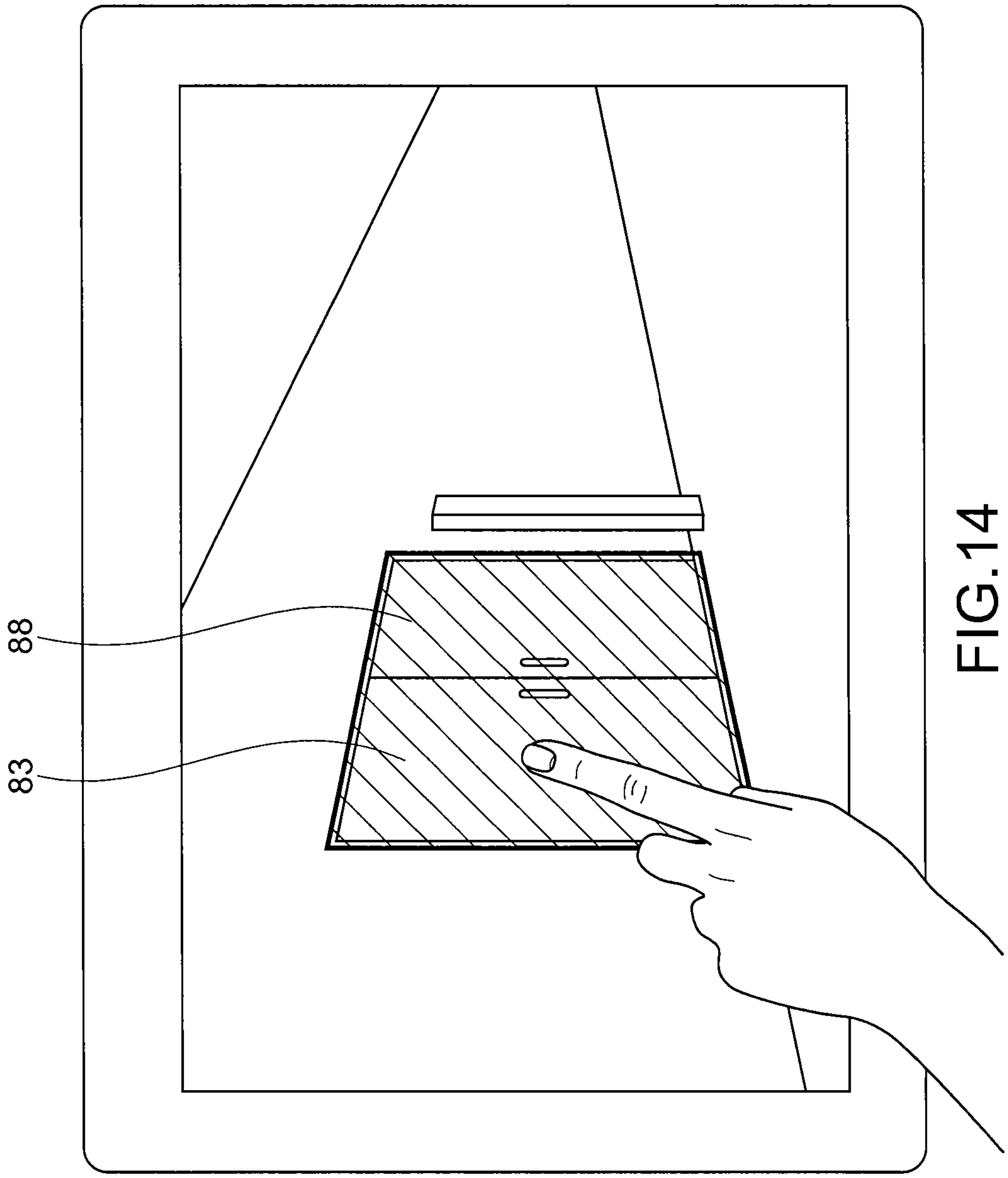
FIG. 14 is a diagram for showing a process capable of being executed by the surveillance camera system according to the present disclosure.

In addition, as shown in FIG. 14, a predetermined UI 88 is overlaid on the door 83. For example, in the case where a person approaches the door 83, the UI 88 is displayed. In the case where there is no problem in authentication or the like, a user can control to open and close the door 83 only by touching the UI 88, that is, the door 83. As a result, it is possible to perform an instinctive operation.

Figure 15:
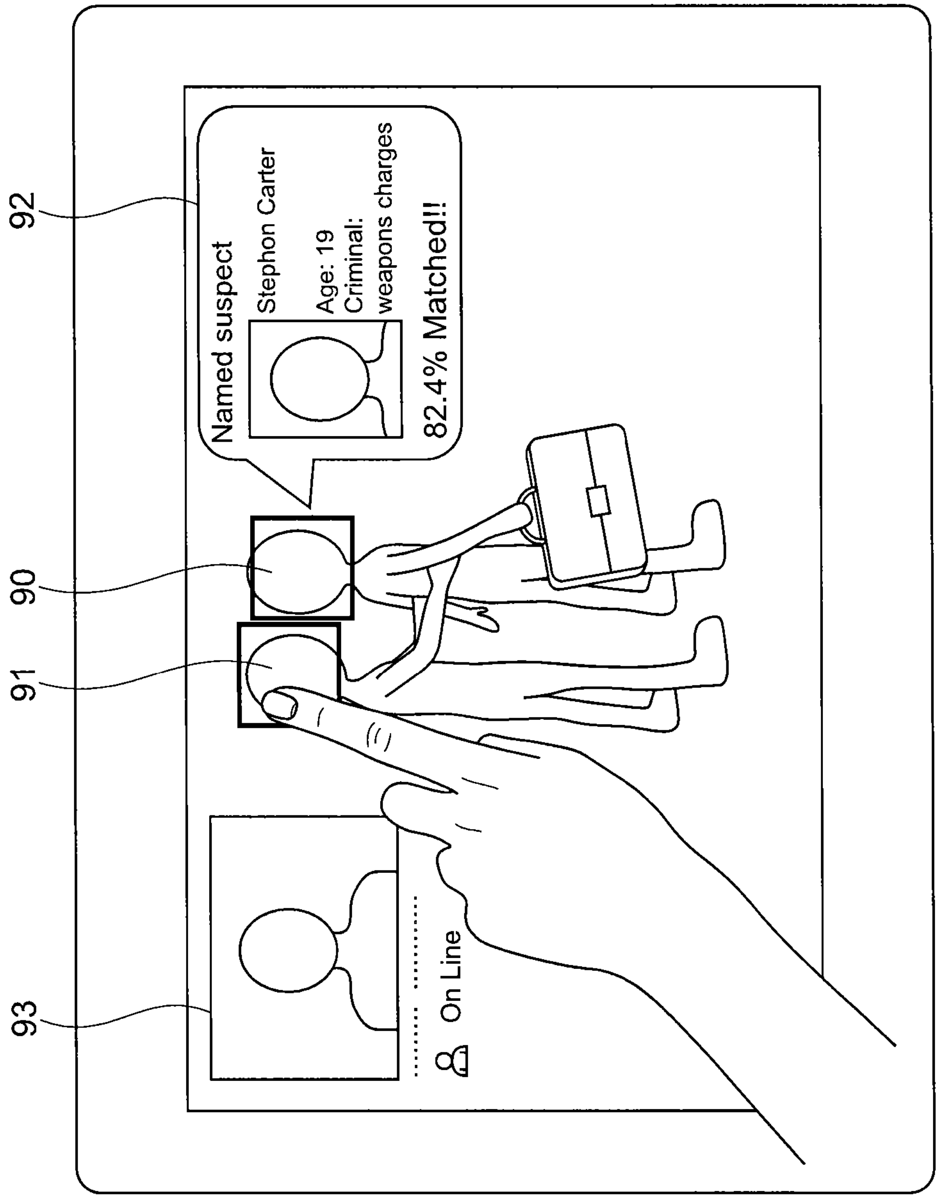
FIG. 15 is a diagram for showing a process capable of being executed by the surveillance camera system according to the present disclosure.

FIG. 15 is a diagram showing an image when a suspect is detected. For example, the person object detected from a monitoring image is checked against information of a suspect stored in advance. As a result, when a match rate is larger than a predetermined value, the person is determined as the suspect. In this case, a UI 90 that shows the suspect and a UI 91 of a watchman who tries to catch the suspect are displayed. When the UI 90 of the suspect is touched, the information including the face picture, name, age, and the like is displayed as a suspect information 92. When the UI 91 of the watchman is touched, a watchman information 93 including the face picture, name, and the like of the watchman nearby is displayed. Further, communication to the watchman is started. As a result, it is possible to quickly and easily establish contact with the watchman nearby and thus catch the suspect.

Figure 16:
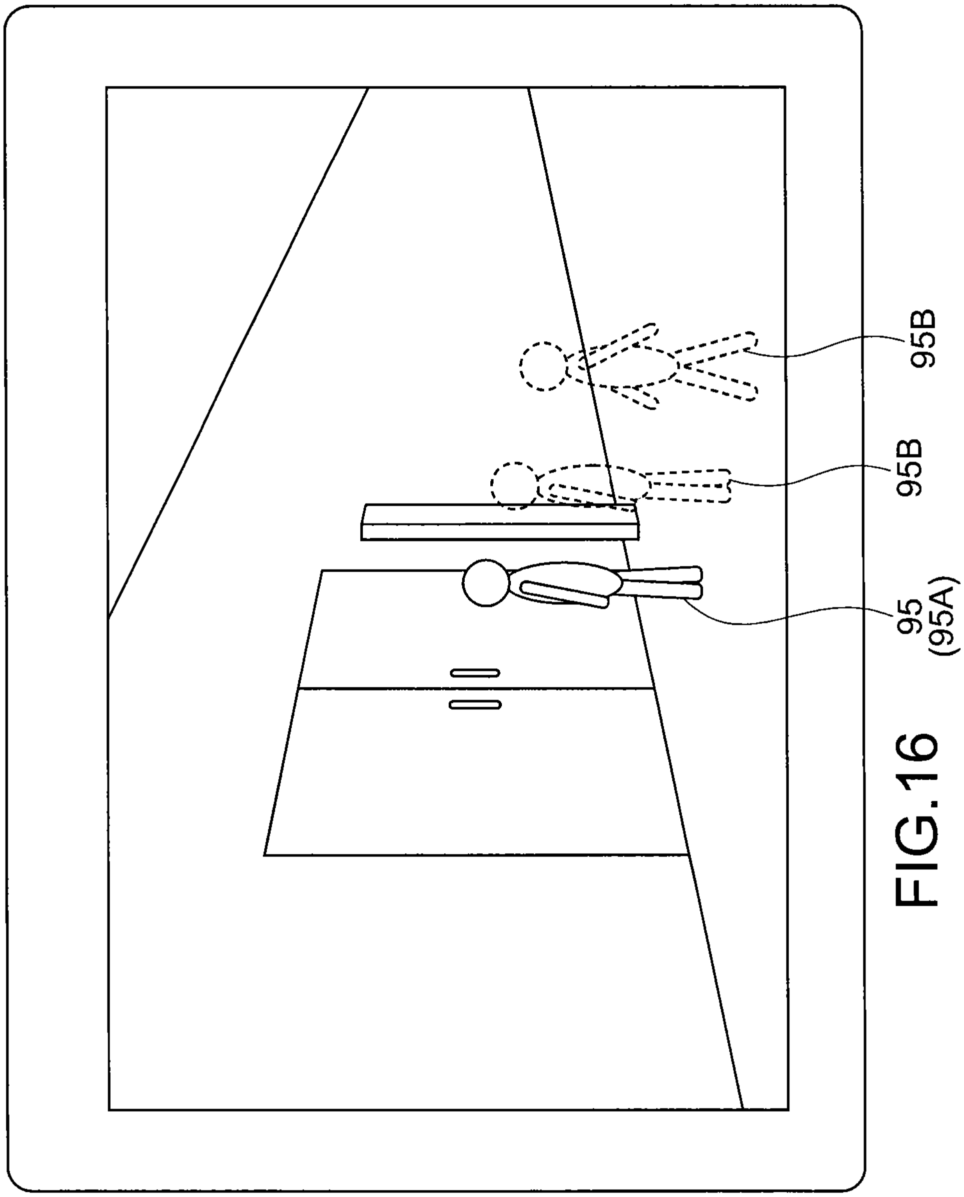
FIG. 16 is a diagram for showing a process capable of being executed by the surveillance camera system according to the present disclosure.

In FIG. 16, a predetermined person out of a plurality of person objects 95 is highlighted as a target person 95A. Persons 95B irrelevant thereto are transparently displayed. As a result, the target person 95A can be easily confirmed. Further, the privacy of the other persons 95B can be protected. In the case where a mosaic or the like is used, the screen becomes unclear and involves poor viewability in many cases. As shown in the figure, by displaying the other persons 95B like transparent persons, the persons are prevented from being specified. In addition, a clear monitoring image can be displayed. For example, an image in which there is no person is used to correct the image as appropriate, and an outline or a filter is used, with the result that the persons can be transparently displayed. Another method may be used.

As shown in FIGS. 12 to 15, by overlaying the UIs, it is possible to easily grasp the relationship between the monitoring images and the UIs. Further, it is possible to reduce the load on a transfer of the line of sight. It should be noted that on the basis of an analysis result of the monitoring image, the UIs may be dynamically structured.

In the above description, the bag is given as the example of the suspicious object. Another object may be detected as the suspicious object. Alternatively, a footprint of a person or the like may be detected as the suspicious object. A time point when the footprint is left is calculated as the second time point, and a person who has left the footprint may be detected on the basis of the image at the time point.

In the above description, the client apparatus and the server apparatus are connected with each other via the network, and the server apparatus and the plurality of cameras are connected via the network. However, the network may not be used to connect the apparatuses. That is, a method of connecting the apparatuses is not limited. Further, in the above description, the client apparatus and the server apparatus are disposed as separate apparatuses. However, the client apparatus and the server apparatus may be integrally constituted to be used as the information processing apparatus according to the embodiment of the present disclosure. The plurality of image pickup apparatuses may be included to constitute the information processing apparatus according to the embodiment of the present disclosure.

The switching process and the like for the images according to the present disclosure described above may be used for another information processing system other than the surveillance camera system.

It is possible to combine at least two characteristic parts out of the characteristic parts in the embodiment described above.

It should be noted that the present disclosure can take the following configurations.

(1) An information processing apparatus, including:

an input unit configured to input a plurality of temporally continuous images taken by an image pickup apparatus;

an attention object detection unit configured to detect an attention object as an attention target from a first image which is an image taken at a first time point out of the plurality of images input; and a calculation unit configured to compare the first image with one or more second images which are one or more images taken at a time point previous to the first time point, to calculate, as a second time point, a time point when the attention object appears in the continuous plurality of images.

(2) The information processing apparatus according to Item (1), in which when a detection of a predetermined object is maintained in one or more images from an image at a predetermined time point previous to the first time point to the first image, the attention object detection unit detects the predetermined object as the attention object, and the calculation unit calculates the predetermined time point as the second time point by using, as a result of the comparison, the maintenance of the detection of the predetermined object with one or more images just before the first image from the image at the predetermined time point being as the one or more second images.

(3) The information processing apparatus according to Item (2), in which the plurality of temporally continuous images are obtained by taking images of a predetermined image pickup space, the information processing apparatus further including a difference detection unit capable of detecting a difference between a reference image, which is obtained by taking an image of the predetermined image pickup space in a reference state, and each of the plurality of images, in which the attention object detection unit determines the maintenance of the detection of the predetermined object on the basis of the difference with the reference image detected by the difference detection unit.

(4) The information processing apparatus according to any one of Items (1) to (3), further including a motion image output unit capable of detecting a motion of the attention object detected and outputting a motion image that represents the motion.

(5) The information processing apparatus according to Item (4), further including a person object detection unit capable of detecting an object of a person from the plurality of images, in which the motion image output unit outputs a motion image of the person object nearest to the attention object in the image at the second time point.

(6) The information processing apparatus according to Item (5), further including:

a first storage unit configured to store information relating to the person object detected; and a person information output unit configured to output, in accordance with an instruction to select the person object nearest to the attention object, information relating to the person object selected.

(7) The information processing apparatus according to any one of Items (4) to (6), further including:

a second storage unit configured to store associating of a position in the motion image with the plurality of images; and an associated image output unit configured to output, in accordance with an instruction to select a predetermined position in the motion image, an image associated with the selected predetermined position from the plurality of images.

(8) The information processing apparatus according to any one of Items (1) to (7), in which the calculation unit calculates the second time point by comparing a first region image that is an image of a region in the first image which includes at least the attention object with one or more second region images that are images of regions in the one or more second images which correspond to the first region image.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:

an input unit configured to input a plurality of temporally continuous images taken by an image pickup apparatus;

an attention object detection unit configured to detect an attention object as an attention target from a first image taken at a first time point out of the plurality of temporally continuous images, wherein the plurality of temporally continuous images are obtained by taking images of a predetermined image pickup space;

a difference detection unit capable of detecting a difference between a reference image and each of the plurality of temporally continuous images, wherein the reference image is obtained by taking an image of the predetermined image pickup space in a reference state;

a calculation unit configured to compare the first image with one or more second images taken at a time point previous to the first time point, to calculate a second time point, when the attention object appears in the continuous plurality of images; and a person object detection unit capable of detecting a person nearest to the attention object in the image at the second time point.

2. The information processing apparatus according to claim 1, wherein when a detection of a predetermined object is maintained in one or more images from an image at a predetermined time point previous to the first time point to the first image, the attention object detection unit detects the predetermined object as the attention object, and the calculation unit calculates the predetermined time point as the second time point by using, as a result of the comparison, the maintenance of the detection of the predetermined object with one or more images before the first image from the image at the predetermined time point being as the one or more second images.

3. The information processing apparatus according to claim 2, wherein the attention object detection unit determines the maintenance of the detection of the predetermined object on the basis of the difference with the reference image detected by the difference detection unit.

4. The information processing apparatus according to claim 1, further comprising a motion image output unit capable of detecting a motion of the attention object detected and outputting a motion image that represents the motion.

5. The information processing apparatus according to claim 4, wherein the person object detection unit capable of detecting a person from the plurality of temporally continuous images, wherein the motion image output unit outputs a motion image of the person nearest to the attention object in an image obtained from the plurality of temporally continuous images at the second time point.

6. The information processing apparatus according to claim 5, further comprising:

a first storage unit configured to store information relating to the detected person; and a person information output unit configured to output, in accordance with an instruction to select the person nearest to the attention object, information relating to the selected person.

7. The information processing apparatus according to claim 4, further comprising:

a second storage unit configured to store a position in the motion image associated with the plurality of temporally continuous images; and an associated image output unit configured to output, in accordance with an instruction to select a predetermined position in the motion image, an image associated with the selected predetermined position from the plurality of temporally continuous images.

8. The information processing apparatus according to claim 1, wherein the calculation unit calculates the second time point by comparing a first region image in the first image which includes at least the attention object with one or more second region images in the one or more second images, wherein the one or more second region images correspond to the first region image.

9. An information processing method, comprising:

inputting a plurality of temporally continuous images taken by an image pickup apparatus of a predetermined image pickup space;

detecting an attention object as an attention target from a first image taken at a first time point out of the plurality of temporally continuous images;

detecting a difference between a reference image and each of the plurality of temporally continuous images, wherein the reference image is obtained by taking an image of the predetermined image pickup space in a reference state;

comparing the first image with one or more second images taken at a time point previous to the first time point, to calculate a second time point, when the attention object appears in the continuous plurality of images; and detecting a person nearest to the attention object in the image at the second time point.

10. A non-transitory computer readable medium having stored thereon, a set of computer-executable instructions for causing a computer to perform steps comprising:

inputting a plurality of temporally continuous images taken by an image pickup apparatus of a predetermined image pickup space;

detecting an attention object as an attention target from a first image taken at a first time point out of the plurality of temporally continuous images;

detecting a difference between a reference image and each of the plurality of temporally continuous images, wherein the reference image is obtained by taking an image of the predetermined image pickup space in a reference state;

comparing the first image with one or more second images taken at a time point previous to the first time point, to calculate a second time point, when the attention object appears in the continuous plurality of images; and detecting a person nearest to the attention object in the image at the second time point.

11. An information processing system, comprising:

one or more image pickup apparatuses capable of taking a plurality of temporally continuous images, wherein the plurality of temporally continuous images are obtained by taking images of a predetermined image pickup space; and an information processing apparatus including:

an input unit configured to input the plurality of temporally continuous images taken by an image pickup apparatus, an attention object detection unit configured to detect an attention object as an attention target from a first image taken at a first time point out of the plurality of temporally continuous images, a difference detection unit capable of detecting a difference between a reference image and each of the plurality of temporally continuous images, wherein the reference image is obtained by taking an image of the predetermined image pickup space in a reference state, a calculation unit configured to compare the first image with one or more second images taken at a time point previous to the first time point, to calculate a second time point, when the attention object appears in the continuous plurality of images, and a person object detection unit capable of detecting a person nearest to the attention object in the image at the second time point.

* * * * *